Figure 1:
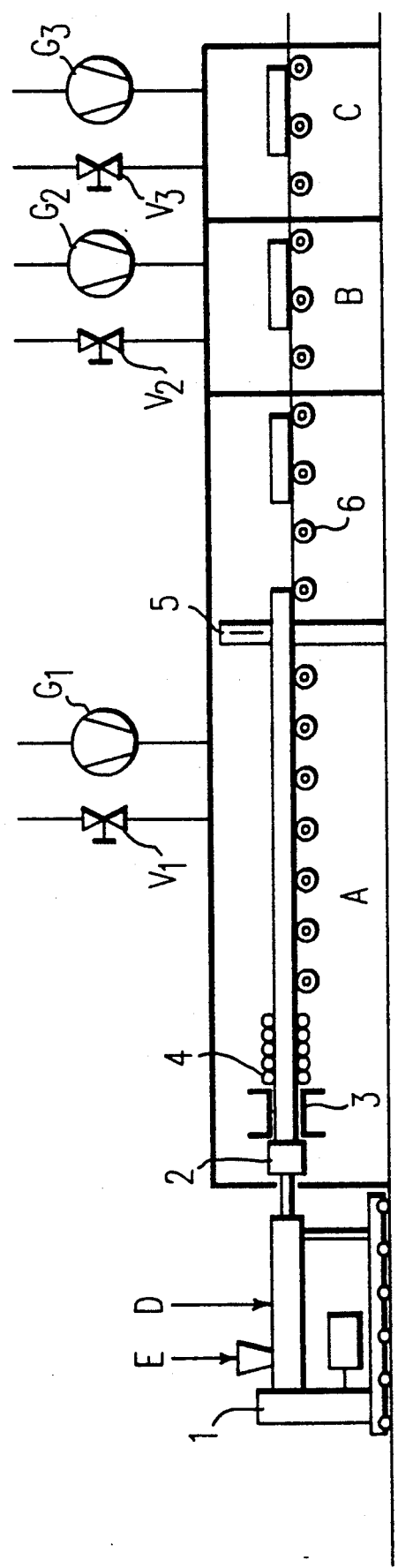

United States Patent [19]

Weber et al.

[11] Patent Number: 5,006,566
[45] Date of Patent: Apr. 9, 1991

[54] PREPARATION OF FOAMS HAVING A HIGH COMPRESSIVE STRENGTH

[75] Inventors: Reinhold Weber, Mutterstadt; Manfred Weilbacher, Frankenthal; Hermann Tatzel, Hirschberg; Ludwig Zuern, Bad Durkheim; Hans D. Zettler, Gruenstadt; Klaus Hinselmann, Mutterstadt, all of Fed. Rep. of Germany

[73] Assignee: BASF Aktiengesellschaft, Ludwigshafen, Fed. Rep. of Germany

[21] Appl. No.: 279,092

[22] Filed: Dec. 2, 1988

[30] Foreign Application Priority Data

Dec. 4, 1987 [DE] Fed. Rep. of Germany ....... 3741095

[51] Int. Cl.$^5$ .............................................. C08J 9/08
[52] U.S. Cl. ....................................... 521/79; 264/51; 264/53; 521/81; 521/97
[58] Field of Search ............... 521/79, 81, 97; 264/51, 264/53

[56] References Cited

U.S. PATENT DOCUMENTS

| | | | |
|---|---|---|---|
| 2,928,130 | 3/1960 | Gray | 521/79 |
| 3,406,230 | 10/1968 | Baxter et al. | 521/79 |
| 4,298,702 | 11/1981 | Hahn et al. | 521/98 |
| 4,306,036 | 12/1981 | Corbett | 521/147 |
| 4,312,910 | 1/1982 | Suh et al. | 521/147 |
| 4,446,253 | 5/1984 | Hahn et al. | 521/79 |
| 4,469,651 | 9/1984 | Hahn et al. | 54/95 |
| 4,470,938 | 9/1984 | Johnson | 264/50 |
| 4,473,665 | 9/1984 | Martini-Vuedensky et al. | 264/50 |
| 4,636,527 | 1/1987 | Suh et al. | 54/146 |

Primary Examiner—Morton Foelak
Attorney, Agent, or Firm—Oblon, Spivak, McClelland, Maier & Neustadt

[57] ABSTRACT

Foams having high compressive strength are obtained by extrusion of a mixture of a styrene polymer and from 3 to 9% by weight of a blowing agent consisting of from 80 to 100% by weight of $CO_2$ and from 0 to 20% by weight of one or more halohydrocarbons or hydrocarbons which are gaseous at room temperature, the mixture being extruded into a zone under from 0.1 to 2 bar gage pressure and the foam being allowed to stabilize under this pressure.

4 Claims, 2 Drawing Sheets

PREPARATION OF FOAMS HAVING A HIGH COMPRESSIVE STRENGTH

Extruded polystyrene foams have become very important on the market for insulating materials. The products possess very low water absorption and excellent insulating capability. Expansion is usually carried out using physical blowing agents, in particular fluorochlorohydrocarbons, which are generally very readily included in the foam and, as heavy gases, play an important role. In addition to the fluorochlorohydrocarbons, additional blowing agents, for example methyl chloride, ethyl chloride or butane, are frequently also employed, and have proven useful during extrusion.

Particularly suitable fluorochlorohydrocarbons are difluorodichloromethane and other perhalogenated hydrocarbons, e.g. dichlorotetrafluoroethane. These substances are extremely stable and nontoxic but have the disadvantage that they accumulate in the atmosphere and, because of their extremely great stability, enter the higher gas layers and may react there with the protective ozone layer. Since this can have an adverse effect on the incidence of radiation on the earth's surface, efforts have long been made to restrict the use of such perhalogenated fluorohydrocarbons which have a long life.

There has been no lack of attempts to use other gases instead of fluorohydrocarbons as blowing agents. The use of methyl chloride leads to foams which exhibit relatively pronounced shrinkage during storage. When ethyl chloride is used, the compressive strength of the foam is unsatisfactory. Carbon dioxide gives foams which have a high proportion of open cells and hence a high water absorption. Even when the blowing agent mixtures described in WO 86/06084 and consisting of 3–45% by weight of carbon dioxide, 5–97% by weight of ethyl chloride and 0–90% by weight of fluorochlorohydrocarbons are used, the compressive strength of the foam is unsatisfactory.

It is an object of the present invention to avoid these disadvantages and to prepare polystyrene foams which exhibit only slight shrinkage and have a high compressive strength and a low water absorption.

We have found, surprisingly, that this object is achieved if the blowing agent used is carbon dioxide, with or without gaseous hydrocarbons or halohydrocarbons, and if the styrene polymer/blowing agent mixture is extruded in a zone under from 0.1 to 2 bar gauge pressure and the foam is allowed to stabilize under this pressure.

The present invention thus relates to a process for the preparation of foams having high compressive strength by extrusion of a mixture of a styrene polymer and from 3 to 9% by weight, based on the styrene polymer, of a blowing agent consisting of (a) from 80 to 100% by weight of carbon dioxide and (b) from 0 to 20% by weight of one or more halohydrocarbons or hydrocarbons which are gaseous at room temperature, with or without conventional additives, wherein extrusion is carried out into a zone under from 0.1 to 2 bar gauge pressure and the foam is allowed to stabilize under this pressure.

Figure 2:
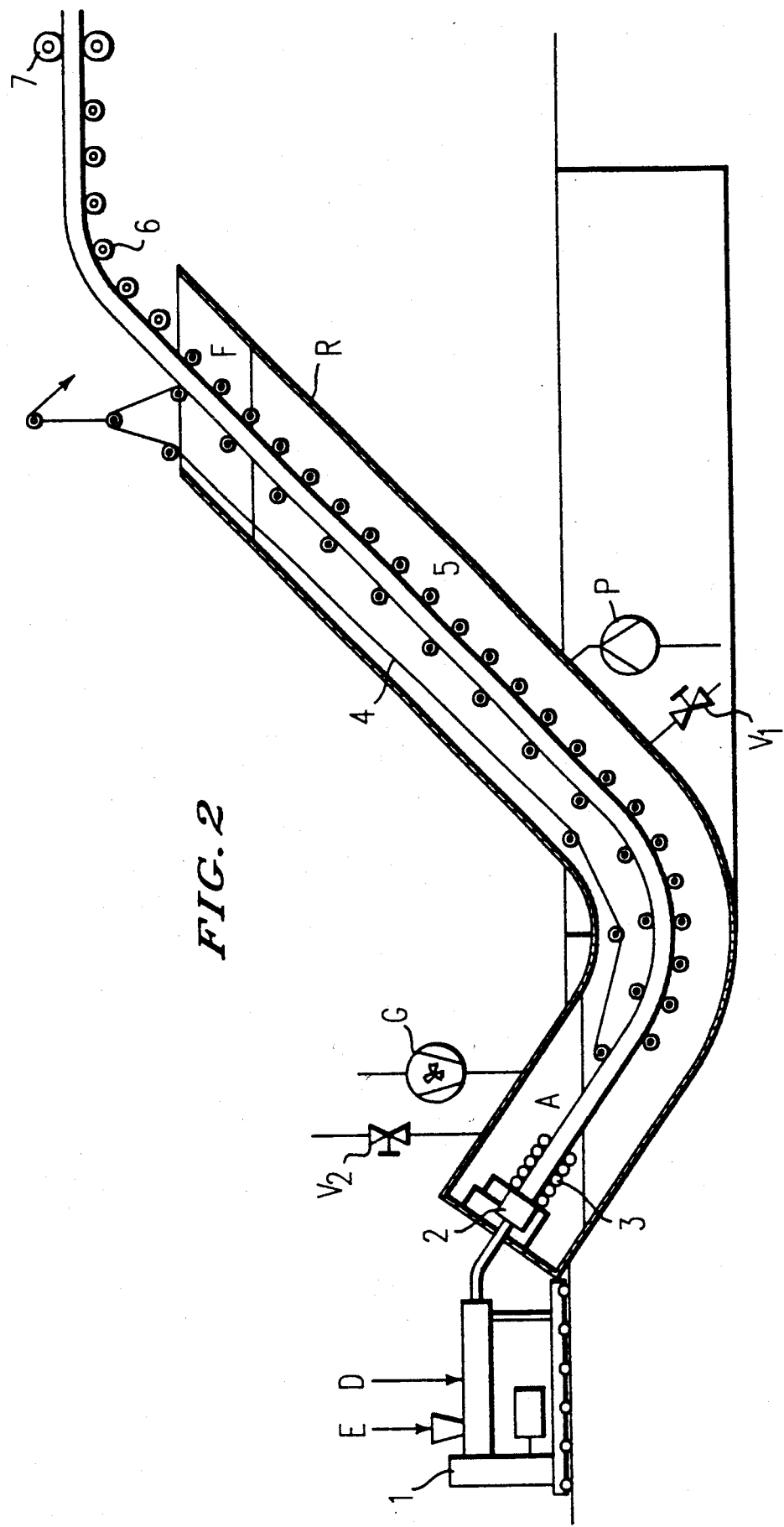

A more complete appreciation of the invention and many of the attendant advantages thereof will be readily obtained as the same becomes better understood by reference to the following detailed description when considered in connection with the accompanying drawings, wherein;

FIG. 1 is a diagram of the apparatus employed in Example 1 for the extrusion of a foamed polystyrene sheet; and FIG. 2 is a diagram of the apparatus employed in Example 2 for the extrusion of a foamed polystyrene band.

If the foam is allowed to expand in a zone under elevated pressure, this elevated pressure also has an advantageous effect on the bulk density of the foam. The higher the pressure, the higher is the bulk density. In this way, it is also possible to obtain foams having good performance characteristics when carbon dioxide alone is used as the blowing agent.

To reduce the bulk density, it is advisable, in addition to carbon dioxide, concomitantly to use small amounts of halohydrocarbons or hydrocarbons which are gaseous at room temperature. It is advisable to keep the amount of the stated additional blowing agents as low as possible in order to reduce environmental pollution.

For the purposes of the present invention, styrene polymers are polystyrene and copolymers of styrene which contain not less than 50% by weight of styrene as copolymerized units. Examples of suitable comonomers are α-methylstyrene, styrenes which are halogenated in the nucleus, styrenes which are alkylated in the nucleus, acrylonitrile, esters of (meth)acrylic acid with alcohols of 1 to 8 carbon atoms, N-vinyl compounds, such as vinylcarbazole, maleic anhydride or small amounts of compounds which contain two polymerizable double bonds, such as butadiene, divinylbenzene or butanediol diacrylate.

The blowing agent used is carbon dioxide or a mixture of carbon dioxide and up to 20% by weight of one or more halohydrocarbons or hydrocarbons which are gaseous at room temperature. Examples of suitable hydrocarbons are propane, butane and isobutane. Examples of suitable halohydrocarbons are methyl chloride, ethyl chloride, dichlorodifluoromethane, monochlorodifluoromethane, dichlorotetrafluoroethane and monochlorotrifluoroethane. The additional blowing agents preferably have a boiling point of from $-50°$ to $+15°$ C.

The blowing agent (mixture) is used in an amount of from 3 to 9% by weight, based on the styrene polymer.

The styrene polymer/blowing agent mixture may contain antistatic agents, stabilizers, colorants, lubricants, fillers, flameproofing agents and/or nucleating agents as conventional additives in the usual amounts.

The foams are prepared in a conventional manner by extrusion. In an extruder, the styrene polymer plasticized by heating is mixed thoroughly with the blowing agent and, if required, the additives. The mixture then passes through a relaxation zone, in which it is cooled to about 100°–120° C. with continuous stirring, and is then extruded through a die, which has a width which is about ⅓ to ½ of the desired molding width, to give moldings, in particular sheets.

An important feature of the process according to the present invention is that the mixture is extruded into a zone under from 0.1 to 2, preferably from 0.3 to 1.8, in particular from 0.4 to 1.6, bar gauge pressure, and the foam is allowed to stabilize under this pressure. The styrene polymer/blowing agent mixture is thus extruded into a chamber under from 0.1 to 2 bar gauge pressure, in which either the pressure to be applied is kept substantially constant or the pressure gradually decreases as the foam passes through. The superatmospheric pressure in the chamber is generated by forcing in an inert gas or inert gas mixture (e.g. $N_2$, a noble gas, $CO_2$ or, if appropriate, air). During the expansion phase, the preselected superatmospheric pressure is kept constant by means of a regulating valve. Compared with extrusion of the mixture in a space under atmospheric pressure, expansion of the mixture in the space under pressure is slowed down and the mixture therefore expands more slowly and to a lesser extent. A tearing of pores with formation of open cells is thus effectively prevented.

On entering the pressure chamber, the expanding mixture is molded by suitable shaping elements to give the desired molding cross-section. In the production of webs, this shaping is advantageously effected by means of a series of guide rolls, as disclosed in, for example, U.S. Pat. No. 4,234,529. The foam is then kept under superatmospheric pressure until it has stabilized. This can be effected, for example, by cooling the foam with water or passing it through a long delay zone in which it is cooled by the colder surrounding atmosphere alone. The foam web is cut inside the pressure chamber to give sheets, and the individual sheets are then discharged through a lock.

However, the foam web can also advantageously be fed through a water bath in the form of an elongated bow, the pressure in the individual regions of this water-filled pressure zone being determined in each case by the height of the liquid column applying a load to the said zone.

The Examples which follow illustrate the preferred embodiments of the novel process. Parts are by weight.

EXAMPLES 1a to c

The experimental apparatus is shown in FIG. 1.

100 parts of polystyrene having a melt flow index of 5.0, 1.5 parts of hexabromocyclododecane and 0.3 part of talc for regulating the cell size were fed continuously to an extruder (1) via the orifice (E) having an internal screw diameter of 120 mm.

A blowing agent mixture consisting of 7.2 parts of $CO_2$ and 1.6 parts of dichlorodifluoromethane (F12) was forced continuously into the extruder through an inlet orifice (D) in the extruder. The gel homogenized in the extruder was then cooled to an outlet temperature of about 110° C. in the course of 25 minutes and extruded through a 300 mm wide and 2.0 mm high die (2) into a 50 m long space (A) under superatmospheric pressure. The gas pressure in space "A" was 0.5 bar (Example 1a) or 1.5 bar (Example 1b). The foam was then fed with the aid of the take-off means (4) through a guide apparatus (3) connected to the extruder, a foamed polystyrene sheet having a cross-sectional area of 500×70 mm being formed. This sheet was then fed to the cutting unit (5), where it was cut into 2,500 mm long pieces. These sections were conveyed via the roller conveyor (6) to the ejection station (B) and (C). The desired gas pressures are adjusted in the chambers (A), (B), and (C) via the pressure-holding stations ($V_1+G_1$), ($V_2+G_2$) and ($V_3+G_3$). In Example 1c, 8 parts of $CO_2$ were used as the blowing agent. The gas pressure in space (A) was 0.9 bar.

The samples were stored for 30 days and then tested. The test data of the Examples are listed in the Table.

EXAMPLE 2

The experimental apparatus is shown in FIG. 2.

The 100 parts of polystyrene having a melt flow index of 5.0, 1.5 parts of hexabromocyclododecane and 0.15 part of talc for regulating the cell size were fed to an extruder (1) via the inlet orifice (E) having an internal screw diameter of 120 mm.

A blowing agent mixture consisting of 1.5 parts of dichlorodifluoromethane (F12) and 7.5 parts of $CO_2$ was forced into the extruder through an inlet orifice (D) in the extruder.

The gel homogenized in the extruder was then cooled to an outlet temperature of 106° C. in the course of 20 minutes and extruded through a 280 mm wide and 1.5 mm high die (2) into a space (A) under superatmospheric pressure. The gas pressure in space (A) was adjusted via (V2) and (G) of the pressure-holding system and by the liquid forced in to level (F) in the 20 m high pipe (R) by means of the pump (P). The foam was then passed through a guide apparatus (3) connected to the extruder, as described in U.S. Pat. No. 4,234,529, an expanded polystyrene band having a cross-section of 600×50 mm² being formed. The polystyrene foam band was conveyed out of the pipe (R) by means of the roller conveyor (5) and the rubber belt (4). The take-off means (7) conveyed the band to the cutting apparatus. After storage for 30 days, the sheets were tested. The Table lists the test values.

EXAMPLE 3

The test was carried out similarly to Example 1.

80 parts of polystyrene having a melt flow index of 5.0 and 20 parts of a styrene copolymer containing 5% of acrylonitrile, as well as 2 parts of hexabromocyclododecane and 0.25 part of a 4:1 mixture of magnesium silicate and aluminum stearate for regulation of cell size were fed continuously to a single-screw extruder.

A blowing agent mixture consisting of 7.5 parts of carbon dioxide and 1.5 parts of dichlorodifluoromethane was fed continuously into the plasticizing zone of the extruder under 200 bar with the aid of a metering unit.

The blowing agent/polymer mixture was cooled to 108° C. in the extruder and extruded through a 300 mm wide and 1.8 mm high die into a 45 m long space which was under 1.5 bar gauge pressure.

The superatmospheric pressure was generated by a circulated gas consisting of 90 parts of nitrogen, 6 parts of carbon dioxide, 4 parts of dichlorodifluoromethane and was kept constant by means of a regulating valve. The resulting $CO_2$ and $F_{12}$ partial pressure caused additional slowing down of the expansion rate (or of the expansion process) and led to a foam structure which was more stable to compressive loads, and reduced the tendency to form open cells.

During passage through the delay zone, which was divided into three chambers, the external superatmospheric pressure was reduced continuously after the foam stabilization phase.

The foam web which stabilized during the cooling phase was cut into individual sheets. The test data for the resulting foam are shown in the Table.

COMPARATIVE EXAMPLES A, B AND C

The procedure was similar to that of Example 1, the blowing agent used comprising 14 parts of dichlorodifluoromethane (F12) or 9 parts of $CO_2$. In Example A, the pressure in space A was brought to 0.9 bar, while Examples B and C were carried out under atmospheric pressure. The test data for the resulting samples are shown in the Table.

TABLE

| | | | | Results of measurements after storage for 30 days | | | | |
|---|---|---|---|---|---|---|---|---|
| | Through-put kg/h | Type of blowing agent and mixing ratio | Amount of blowing agent % by weight | Counter-pressure bar | Sheet thickness mm | Density DIN 53,420 kg/m$^3$ | Cell count Z/mm | Proportion of open cells ISO/DIS 4590 % |
| Example 1a | 650 | $CO_2$/F 12 4:1 | 9 | 0.5 | 70 | 34 | 4 | 3.5 |
| Example 1b | 650 | $CO_2$/F 12 4:1 | 9 | 1.5 | 70 | 45 | 6 | 1.5 |
| Example 1c | 500 | $CO_2$ | 8 | 0.9 | 40 | 38 | 3 | 8 |
| Example 2 | 650 | $CO_2$/F 12 5:1 | 8.5 | 0.6 | 50 | 37 | 4.5 | 4.5 |
| Example 3 | 650 | $CO_2$/F 12 5:1 | 9 | 1.5 | 80 | 43 | 6 | 1.0 |
| Comparison A | 600 | F 12 | 14 | 0.9 | 40 | 42 | 7 | 0.5 |
| Comparison B | 600 | F 12 | 14 | 0 | 40 | 33 | 5 | 3.0 |
| Comparison C | 600 | $CO_2$ | 9 | 0 | 40 | 32 | 2 | 32 |

| | Water absorption DIN 53,433 % by weight | Thermal conductivity DIN 52,612 W/m.K | Compressive strength DIN 53,577 N/mm$^2$ | Heat distortion resistance DIN 53,462 % by volume |
|---|---|---|---|---|
| Example 1a | 0.12 | 0.032 | 0.38 | +1.0 |
| Example 1b | 0.10 | 0.032 | 0.45 | +1.0 |
| Example 1c | 0.25 | 0.0395 | 0.36 | +0.8 |
| Example 2 | 0.15 | 0.036 | 0.39 | +0.9 |
| Example 3 | 0.07 | 0.032 | 0.48 | +1.0 |
| Comparison A | 0.06 | 0.024 | 0.42 | +7.5 |
| Comparison B | 0.13 | 0.027 | 0.28 | +6.5 |
| Comparison C | 5.6 | 0.046 | 0.30 | 0.5 |

We claim:

1. A process for the preparation of a foam having high compressive strength by extrusion of a mixture of a styrene polymer and from 3 to 9% by weight, based on the styrene polymer, of a blowing agent consisting of
   (a) from 80 to 100% by weight of carbon dioxide and
   (b) from 0 to 20% by weight of one or more halohydrocarbons or hydrocarbons which are gaseous at room temperature, with or without conventional additives, wherein the mixture is extruded into a zone under from 0.1 to 2 bar gauge pressure and the foam is allowed to stabilize under this pressure.

2. The process as claimed in claim 1, wherein the blowing agent component b) has a boiling point of from −50° to +15° C.

3. The process as claimed in claim 1, wherein said mixture is extruded into said zone under a pressure of 0.3 to 1.8 bar gauge pressure.

4. The process as claimed in claim 3, wherein said pressure ranges from 0.4 to 1.6 bar gauge pressure.

* * * * *